Patented Mar. 15, 1938

2,111,126

UNITED STATES PATENT OFFICE 2,111,126

SUBSTANCES PRODUCING FLUORESCENCE

Hans Rabe, Ludwigshafen-on-the-Rhine, Germany, assignor to I. G. Farbenindustrie Aktiengesellschaft, Frankfort-on-the-Main, Germany No Drawing. Application November 28, 1933, Serial No. 700,079. In Germany December 2, 1932

8 Claims. (Cl. 260—168)

The present invention relates to substances which are soluble in hydrocarbon oils and produce fluorescence therein, and to a process of making such substances.

It is already known that by the polymerization of aromatic hydrocarbons containing more than one nucleus substances are obtained under appropriate conditions of temperature and in the presence of catalysts of the Friedel-Crafts' type which when dissolved in a mineral oil impart to the latter a green fluorescence.

These products have a from tarry to asphaltic consistency, may be dissolved in lubricating oils while warming and have the disadvantage that the greater part of them is precipitated again after allowing the solution to stand for some time and that in many cases they give only a slight opalescence. These products furthermore are not soluble in benzines but are precipitated by them.

It has been suggested elsewhere to produce substances producing fluorescence, which are readily soluble in hydrocarbon oils (by which expression I understand heavy oils or middle oils or lubricating oils or liquid motor fuels, such as benzines, or other liquid hydrocarbon fractions—whether they may be of naphthenic or paraffinic base—), even at low temperatures, by subjecting olefines of purely aliphatic constitution which are liquid at ordinary temperature to condensation with polynuclear organic substances in which none of the nuclei is saturated with hydrogen, at an elevated temperature, in the presence of condensing catalysts of the Friedel-Crafts' type, in particular aluminium chloride. Those of the aforesaid polynuclear substances are of particular advantage which are devoid of substituents. As such substances may be mentioned unsubstituted polynuclear aromatic hydrocarbons, such as naphthalene or anthracene or phenanthrene, or polynuclear heterocyclic compounds, such as carbazole. As olefines suitable as initial materials for this conversion may be mentioned the liquid products obtained by the cracking, preferably in the vapor phase, of paraffinic hydrocarbons, such as hard or soft paraffin wax, petrolatum, or oils entirely or mainly consisting of paraffinic hydrocarbons, and also normally liquid olefines obtained by the dehydration of higher aliphatic alcohols, preferably such as contain at least 6 carbon atoms, such as octodecyl alcohol.

The said condensation of olefines and polynuclear aromatic substances, preferably hydrocarbons, is effected at temperatures between 70° and 250° C., preferably between 125° and 200° C. In order to carry off the great heat evolved by the said condensation, the treated materials are preferably diluted with an inert diluent, as for example a benzine fraction boiling between 150° and 200° C., or another oil boiling at the same or higher temperatures, and externally cooled simultaneously. The amount of polynuclear aromatic substances should be greater than 20 per cent of the amount of olefine employed, but is advantageously not greater than from 60 to 70 per cent of the said amount of olefines since a surplus does not take part in the reaction, but acts only as a diluent and would have to be distilled from the resulting condensation product. The intensity of the fluorescence caused by a certain amount of the condensation product is greater, the greater the amount of aluminium chloride employed. Preferably from 20 to 50 per cent of aluminium chloride with reference to the amount of the initial olefines to be condensed are employed, though larger amounts of aluminium chloride may be used. The products obtained according to the present invention ordinarily have a mean molecular weight of between 600 and 800.

The substances producing fluorescence thus obtained are thickly liquid, viscous products which at ordinary temperature may be dissolved in hydrocarbon oils of naphthenic or paraffin base, such as in lubricating oils or in benzine. No precipitation or resinification occurs in the oils mixed with the said substances. The oils containing these substances are entirely clear in transmitted light. An addition of from 0.1 to 0.2 per cent is sufficient for imparting to the oil a red color in transmitted light and a green color in incident light.

The said products, however, when added to hydrocarbon oils and especially lubricating oils, sometimes have the disadvantage that they produce a green fluorescence having a bluish shade which is undesirable and which fluorescence often has not sufficient stability to light.

I have now found that this objection can be overcome by treating the aforesaid condensation products with hydrogen in the presence of hydrogenating catalysts at elevated temperatures and preferably under pressure, until they impart a yellowish-green fluorescence to lubricating oils.

For this treatment, the condensation products are preferably dissolved in an inert solvent, as for example benzines of high boiling point, middle oils or lubricating oils of any consistency. The treatment with hydrogen is advantageously effected between about 50° and about 250° C., preferably between about 70° and about 175° C.

The pressure may amount to from 20 to 200 atmospheres, but is not restricted to these limits.

As catalysts may be mentioned copper, cobalt, or nickel alone or in admixture with each other or with other substances or on carrier substances, such as carbon, kieselguhr, pumice or other inert substances. Furthermore all the metals or metal compounds known as hydrogenation catalysts, as for example oxides of metals of the 2nd to the 7th groups of the periodic system, especially those of group 6, or halides of silver, copper, cadmium, titanium, tin, vanadium, molybdenum, tungsten, manganese, nickel or cobalt, or sulphides of the 2nd to the 8th groups of the periodic system, in particular those of group 6, are suitable.

The conditions as regards temperature, pressure, catalyst, duration of treatment and the like to be maintained during the treatment with hydrogen vary with the specific nature of the condensation products; they should be so selected in each case that the products acquire the desired yellowish-green shade of color of certain natural lubricating oils without undergoing loss in the intensity of color. The most suitable conditions may be readily ascertained in each case by preliminary experiment.

The following examples will further illustrate how the said invention may be carried out in practice, but the invention is not restricted to these examples.

Example 1

The product obtained by the condensation at a temperature of about 100° C. and in the presence of anhydrous aluminium chloride, of 30 parts of naphthalene with 100 parts of a cracking product derived from soft paraffin wax which condensation product when added to lubricating oils imparts to them a green fluorescence having a somewhat bluish shade and which is not stable to light, is treated with hydrogen under a pressure of 100 atmospheres for half an hour at 100° C. in the presence of a nickel catalyst precipitated on kieselguhr. The reaction product is separated from catalyst by filtration and imparts a yellowish-green fluorescence stable to light to lubricating oils when added thereto.

Example 2

A product obtained by the condensation of a mixture of naphthalene, anthracene and carbazole with liquid olefines obtained by the dehydration of higher alcohols is subjected to a treatment with hydrogen at 120° C. under a pressure of 200 atmospheres in the presence of 10 per cent of a catalyst consisting of copper, nickel and cobalt precipitated on pumice. After 15 minutes the hydrogen treatment is interrupted and the product is separated from the catalyst by filtration. When added to an oil in an amount of 0.5 per cent it improves its setting point and imparts to it a yellow-green fluorescence stable to light, the color of the oil in transmitted light being red.

What I claim is:—

1. A process for the production of a yellowish-green fluorescence producing substance which is soluble in hydrocarbon oils, which comprises subjecting a mixture of a liquid olefin of purely aliphatic constitution with more than 20% with reference to said olefin of a polynuclear substance in which none of the nuclei is saturated with hydrogen to condensation at a condensing temperature and in the presence of at least 20% with reference to said olefin of a condensing agent of the Friedel-Crafts' type, and treating the resulting condensation product with hydrogen in the presence of hydrogenating catalyst at a temperature between 50° and 250° C.

2. Process according to claim 1 in which the hydrogenation is effected between 50° and 250° C. and under a pressure ranging from approximately 20 to 200 atmospheres.

3. Process according to claim 1 in which the hydrogenation is effected at a temperature between 70° and about 175° C.

4. A process for the production of a yellowish-green fluorescence producing substance which is soluble in hydrocarbon oils, which comprises subjecting a mixture of a liquid olefin of purely aliphatic constitution with more than 20% with reference to said olefin of a polynuclear substance in which none of the nuclei is saturated with hydrogen to condensation at a condensing temperature and in the presence of at least 20% with reference to said olefin of a condensing agent of the Friedel-Crafts' type, dissolving the resulting condensation products in an inert hydrocarbon solvent, and subjecting the solution to hydrogenation in the presence of a hydrogenating catalyst at a temperature between 50° and 250° C.

5. Process according to claim 4 in which the hydrogenation is effected between 50° and 250° C., and under a pressure ranging from approximately 20 to 200 atmospheres.

6. Process according to claim 4 in which the hydrogenation is effected at a temperature between 70 and about 175° C.

7. A process for the production of a yellowish-green fluorescence producing substance which is soluble in hydrocarbon oils, which comprises subjecting a mixture of a liquid olefin of purely aliphatic constitution obtained by cracking paraffin wax with more than 20% with reference to said olefins of naphthalene to condensation at a condensing temperature and in the presence of at least 20% with reference to said olefin of a condensing agent of the Friedel-Crafts' type, dissolving the resulting condensation products in an inert hydrocarbon solvent, and subjecting the solution to hydrogenation in the presence of a hydrogenating catalyst at a temperature between 50° and 250° C.

8. A process for the production of a yellowish-green fluorescence producing substance which is soluble in hydrocarbon oils which comprises subjecting a mixture of an olefin of purely aliphatic constitution and liquid at ordinary room temperature with from 20 to 70% with reference to said olefin of a polynuclear aromatic substance in which none of the nuclei is saturated with hydrogen to condensation at a temperature between 70 and 250° C., and in the presence of at least 20% with reference to said olefin of a condensing agent of the Friedel-Crafts' type for a reaction time such as to produce substances soluble in hydrocarbon oils, and having a mean molecular weight of between 600 and 800, and treating the substances with hydrogen in the presence of hydrogenating catalyst at a temperature between 50° and 250° C.

HANS RABE.